United States Patent
Barker et al.

(10) Patent No.: US 7,384,577 B2
(45) Date of Patent: Jun. 10, 2008

(54) BLACK CONDUCTIVE THICK FILM COMPOSITIONS, BLACK ELECTRODES, AND METHODS OF FORMING THEREOF

(75) Inventors: Michael F. Barker, Raleigh, NC (US); Keiichiro Hayakawa, Tokyo (JP); Hisashi Matsuno, Tokyo (JP)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/369,550

(22) Filed: Mar. 7, 2006

(65) Prior Publication Data

US 2006/0216529 A1    Sep. 28, 2006

Related U.S. Application Data

(60) Provisional application No. 60/659,839, filed on Mar. 9, 2005.

(51) Int. Cl.
*H01B 1/00* (2006.01)
*H01B 1/02* (2006.01)
*H01B 1/12* (2006.01)
*B32B 15/00* (2006.01)

(52) U.S. Cl. .............. 252/500; 252/518.1; 252/519.33; 428/432

(58) Field of Classification Search ................. 252/500, 252/518.1, 519.33; 430/321; 522/81; 428/432
See application file for complete search history.

(56) References Cited

U.S. PATENT DOCUMENTS 2,760,863 A    8/1956    Plambeck, Jr.

(Continued)

FOREIGN PATENT DOCUMENTS

JP    HEI 10-73233 A    3/1989

(Continued)

*Primary Examiner*—Mark Kopec
*Assistant Examiner*—Jaison Thomas

(57) ABSTRACT

The present invention provides a method for forming a black electrode by performing sintering at a temperature in the range of 500-600° C. after applying a lead-free black conductive composition to a substrate. The aforementioned black electrode comprises a binder comprising a crystallized glass component. The aforementioned black conductive composition comprises conductive particles of black $RuO_2$, lead-free black ruthenium-based polyoxide, and mixtures thereof in an amount of 4-30 wt %, based on the total weight of the composition, a lead-free non-conductive black oxide in an amount of 0-30 wt %, based on the total weight of the composition, and a lead-free bismuth-based glass binder in an amount of 10-50 wt %, based on the total weight of the composition.

5 Claims, 5 Drawing Sheets

U.S. PATENT DOCUMENTS

| | | |
|---|---|---|
| 2,850,445 A | 9/1958 | Oster |
| 2,875,047 A | 2/1959 | Oster |
| 2,927,022 A | 3/1960 | Martin et al. |
| 3,074,974 A | 1/1963 | Gebura |
| 3,097,096 A | 7/1963 | Oster |
| 3,097,097 A | 7/1963 | Oster et al. |
| 3,145,104 A | 8/1964 | Oster et al. |
| 3,380,381 A | 4/1968 | Musgrave |
| 3,427,161 A | 2/1969 | Laridon et al. |
| 3,479,186 A | 11/1969 | Taylor et al. |
| 3,549,367 A | 12/1970 | Chang et al. |
| 3,583,931 A | 6/1971 | Bouchard |
| 4,162,162 A | 7/1979 | Dueber |
| 5,032,490 A | 7/1991 | Nebe et al. |
| 5,851,732 A * | 12/1998 | Kanda et al. ............... 430/321 |
| 6,555,594 B1 * | 4/2003 | Fukushima et al. ........... 522/81 |
| 7,214,466 B1 * | 5/2007 | Yang et al. .................. 430/198 |

FOREIGN PATENT DOCUMENTS

| | | |
|---|---|---|
| JP | 2002-373592 A | 12/2002 |
| JP | 2002367518 A | 12/2002 |
| JP | 2003521092 A | 7/2003 |
| JP | 2003-223851 A | 8/2003 |
| JP | 3479463 | 12/2003 |
| JP | 3510761 | 3/2004 |
| JP | 3541125 B2 | 4/2004 |
| JP | 2004-158456 | 6/2004 |
| JP | 3538387 | 6/2004 |
| JP | 3538408 | 6/2004 |
| WO | WO 02/03766 A2 | 1/2002 |

* cited by examiner

BLACK CONDUCTIVE THICK FILM COMPOSITIONS, BLACK ELECTRODES, AND METHODS OF FORMING THEREOF

CROSS-REFERENCE TO RELATED APPLICATION

This application claims the benefit of U.S. Provisional Application No. 60/659,839 filed Mar. 9, 2005.

FIELD OF THE INVENTION

The present invention is directed to black conductive compositions, black electrodes made from such compositions and methods of forming such electrodes, more specifically the present invention is directed to the use of such compositions, electrodes, and methods in flat panel display applications, including alternating-current plasma display panel devices (AC PDP). The invention is further directed to AC PDP devices themselves.

BACKGROUND OF THE INVENTION

While the background of the present invention is discussed in terms of plasma display panel (PDP) applications, it is understood that the present invention is useful in flat panel display applications, in general.

The PDP typically comprises a pair of forward and backward insulation substrates arranged in opposition to each other to form a plurality of cells as display elements each defined by the insulation substrates supported with a constant interval and cell barriers arranged between the insulation substrates, two crossing electrodes disposed on internal surfaces of the insulation substrates with a dielectric layer interposed between the electrodes which cause electric discharge in a plurality of cells by application of an alternating current. Due to this application of alternating current, phosphor screens formed on the wall surface of the cell barrier emit light and display images which are passed through the transparent insulation substrate (typically called the front glass substrate or plate).

One area of concern for PDP manufacturers is display contrast, which affects the ultimate picture viewed by the consumer. To improve the display contrast, it is essential to decrease the reflection of external light from the electrodes and conductors arranged on the front glass substrate of the PDP device. This reflection decrease can be accomplished by making the electrodes and conductors black as viewed through the front plate of the display.

Furthermore, another area of concern for PDP manufacturers is environmental in nature and is the lead and cadmium contained in the prior art black conductor compositions and black electrodes of the PDP device. It is desirable to reduce and/or eliminate the lead and cadmium contained in the black conductor compositions and electrodes while still maintaining the required physical and electrical properties of the compositions and electrodes.

For example, in Japanese Kokai Patent No. HEI 10[1998]-73233 and its division Japanese Kokai Patent No. 2004-158456, light-forming black electrode compositions containing conductive particles consisting of at least one substance chosen from ruthenium oxide, ruthenium polyoxide, or their mixture and an inorganic binder, black electrodes using such compositions, plasma display panels using such black electrodes, and a method for making such a plasma display panel are disclosed. These literature references are not directed to lead-free black conductive compositions. In these references, there are no descriptions on lead-free black conductive compositions in terms of properties such as the appearance and strength of black electrodes obtained by sintering the compositions, electrical properties such as resistance, and a balance of all the properties for PDP electrodes.

Japanese Patent No. 3510761 discloses alkali-developable photocurable conductive paste compositions for plasma display panels, easily forming high-precision electrode circuits on large areas by photolithography and firing below 600° C. Such compositions contain (A) copolymer resins obtained by the addition of glycidyl acrylate and/or glycidyl methacrylate to copolymers of methyl methacrylate and methacrylic acid and/or acrylic acid; (B) photochemical polymerization initiator; (C) photopolymerizable monomer; (D) at least one conductive metal powder selected from Au, Ag, Ni, and Al; (E) glass frit; and (F) a phosphoric acid compound. Particularly in this literature, a low-melting glass frit is described using lead oxide as the preferred main component, while there are no descriptions of lead-free conductive compositions, especially black conductive compositions.

Japanese Patent No. 3541125 discloses alkali-developable curable conductive paste compositions that have excellent adhesion to the substrate after being fired, with adhesion between layers, suppression of curling, easy formation of high-precision conductive circuit patterns in large areas by photolithography, and are especially useful for forming underlayer electrode circuits of bus electrodes formed on the front substrate of plasma display panel. These compositions consist of: (A) carboxy-group-containing resins; (B) photopolymerizable monomer; (C) photochemical polymerization initiator; (D) silanol-group-containing synthetic amorphous silica fine powder; (E) conductive powder; and if needed (F) heat-resistant black pigment; (G) glass frit; and (H) stabilizer. In particular, this literature has a description of a low-melting glass frit using lead oxide as the preferred main component, while there are no descriptions of lead-free conductive compositions, especially black conductive compositions.

Japanese Patent No. 3479463 discloses photocurable conductive compositions providing excellent adhesion on a substrate in steps involving drying, exposure, development and firing, and resolution, satisfying the need for both a sufficient conductivity and blackness after being fired and discloses plasma display panels (PDP) with formation of the underlayer (black layer) electrode circuit using such compositions. The basic first embodiment of the compositions described in this literature contains (A) black conductive microparticles having a surface area to weight ratio larger than 20 $m^2/g$ and containing at least one substance chosen from ruthenium oxide or other ruthenium compound, copper-chromium black composite oxide and copper-iron black composite oxide, (B) an organic binder, (C) a photopolymerizable monomer, and (D) a photochemical polymerization initiator. The second embodiment contains (E) inorganic fine particles in addition to the above components. In this literature, with respect to this composition, the inorganic fine particles (E) contain, as needed, glass powder with a softening point of 400-600° C., conductive powder, heat-resistant black pigment, silica powder, etc. However, in the compositions of this literature, glass powder is not an essential component, and even when a glass component is added, lead oxide is described as the preferred main component, with no disclosure of lead-free black conductive compositions.

Japanese Patent No. 3538387 discloses photocurable conductive compositions having excellent storage stability, providing excellent adhesion on substrates in the different steps of drying, exposure, development and firing, and resolution, and satisfying the need for both sufficient blackness after being fired, and discloses plasma display panels (PDP) with the formation of the underlayer (black layer) electrode circuit using such compositions. The basic first embodiment of these photocurable resin compositions contains (A) tricobalt tetroxide ($Co_3O_4$) black microparticles, (B) organic binder, (C) photopolymerizable monomer, and (D) photochemical polymerization initiator. The second embodiment contains (E) inorganic microparticles in addition to the above components. In this literature, with respect to this composition, the inorganic fine particles (E) contain, as needed, a glass powder with a softening point of 400-600° C., conductive powder, heat-resistant black pigment, silica powder, etc. However, the compositions of this literature do not contain conductive materials such as ruthenium oxide, and glass powder is not an essential component. Even when a glass component is added, lead oxide is described as the preferred main component, with no disclosure of lead-free black conductive compositions.

Japanese Patent No. 3538408 discloses photocurable conductive compositions having excellent storage stability, providing excellent adhesion on substrates in different steps of drying, exposure, development and firing, and resolution, and satisfying the need for both sufficient conductivity and blackness after being fired, and discloses plasma display panels (PDP) with the formation of the underlayer (black layer) electrode circuit using such compositions. The basic first embodiment of these photocurable resin compositions contains (A) black inorganic microparticles such as inorganic binder-coated ruthenium oxide or another ruthenium compound, copper-chromium black composite oxide, copper-iron black composite oxide, cobalt oxide, etc., (B) organic binder, (C) photopolymerizable monomer, and (D) photochemical polymerization initiator. The photocurable compositions described in this literature are characterized by containing inorganic binder-coated black inorganic microparticles (A). The inorganic binder-coated black inorganic microparticles (A) are obtained by pulverizing molten materials of inorganic microparticles and an inorganic binder, with an inorganic binder having a softening point of 400-600° C. and glass powder with lead oxide as the main component being described as preferred, but with no disclosure of lead-free black conductive compositions.

Japanese Kohyo Patent Application No. 2003-521092 (Thompson plasma) disclosed a method for forming the face plate of a plasma display panel having a step in which a paste containing a metal powder and a mineral-based coupling agent is used to deposit an electrode, as well as a step in which the deposited electrode is sintered. This invention is characterized by the fact that the composition of the mineral-based coupling agent and sintering conditions are adjusted such that the coupling agent is recrystallized after the deposited electrode is sintered. The subject of this reference is not the lead-free coupling agent and is characterized by the fact that the temperature for sintering the electrode does not exceed 470° C. Also, the purpose of this reference is to eliminate the yellow color forming during the heat treatment of the substrate.

Japanese Kokai Patent Application No. 2002-367518 disclosed a type of electrode material used for an Ag electrode or black stripe, which can prevent blisters during sintering by using a crystallized glass frit that acts as a coupling agent. This invention is characterized by using a fluorine-containing glass frit, but the subject of this invention is not a lead-free glass frit. Therefore, there is also no description regarding the manufacturing method of a lead-free black electrode or the lead-free black electrode itself. In particular, the manufacturing method of a black electrode containing a lead-free crystalline glass binder is not disclosed in these references.

Japanese Kokai Patent Application No. 2002-373592 disclosed a type of electrode material used for an Ag electrode or black stripe, which can prevent blisters during sintering by using a crystallized glass frit that acts as a coupling agent. This invention is characterized by using a lead-containing glass frit, but the subject of this invention is not the lead-free glass frit. Although a lead-free glass frit is mentioned in this reference, there is no description regarding a lead-free black electroconductive composition using a lead-free bismuth-based crystallized glass frit or lead-free black electrode using the aforementioned lead-free black electroconductive composition.

Japanese Kokai Patent Application No. 2003-223851 (patent reference 11) disclosed a type of plasma display substrate structural body and its manufacturing method. For this substrate structural body of a plasma display with an electrode and dielectric layer formed on a substrate, the dielectric layer is formed by a glass layer with a low melting point, the electrode is formed by a metal layer containing crystallized glass, and the electrode and dielectric layer are sintered at the same time. According to this reference, snaking, disconnection, and floating of the bus electrode or black electrode can be prevented by reducing the number of rounds of sintering and by using crystallized glass. However, there is no detailed description regarding the composition, content, etc. of the crystallized glass, and the subject is not a lead-free glass composition. In addition, although it is disclosed that the crystallization peak temperature of the crystallized glass is lower than 560-590° C., the specific temperature is not disclosed at all.

The present inventors therefore desired to provide novel black conductive compositions to be used in flat panel display devices, for forming black electrodes having a desirable balance of all the preferred electrode properties including electrode pattern properties, blackness, resistance, etc. Furthermore, the present inventors desired to provide such compositions and electrodes formed therefrom which are lead-free. Still further, the present inventors desired to provide flat panel display devices comprising such electrodes.

Figure 1:
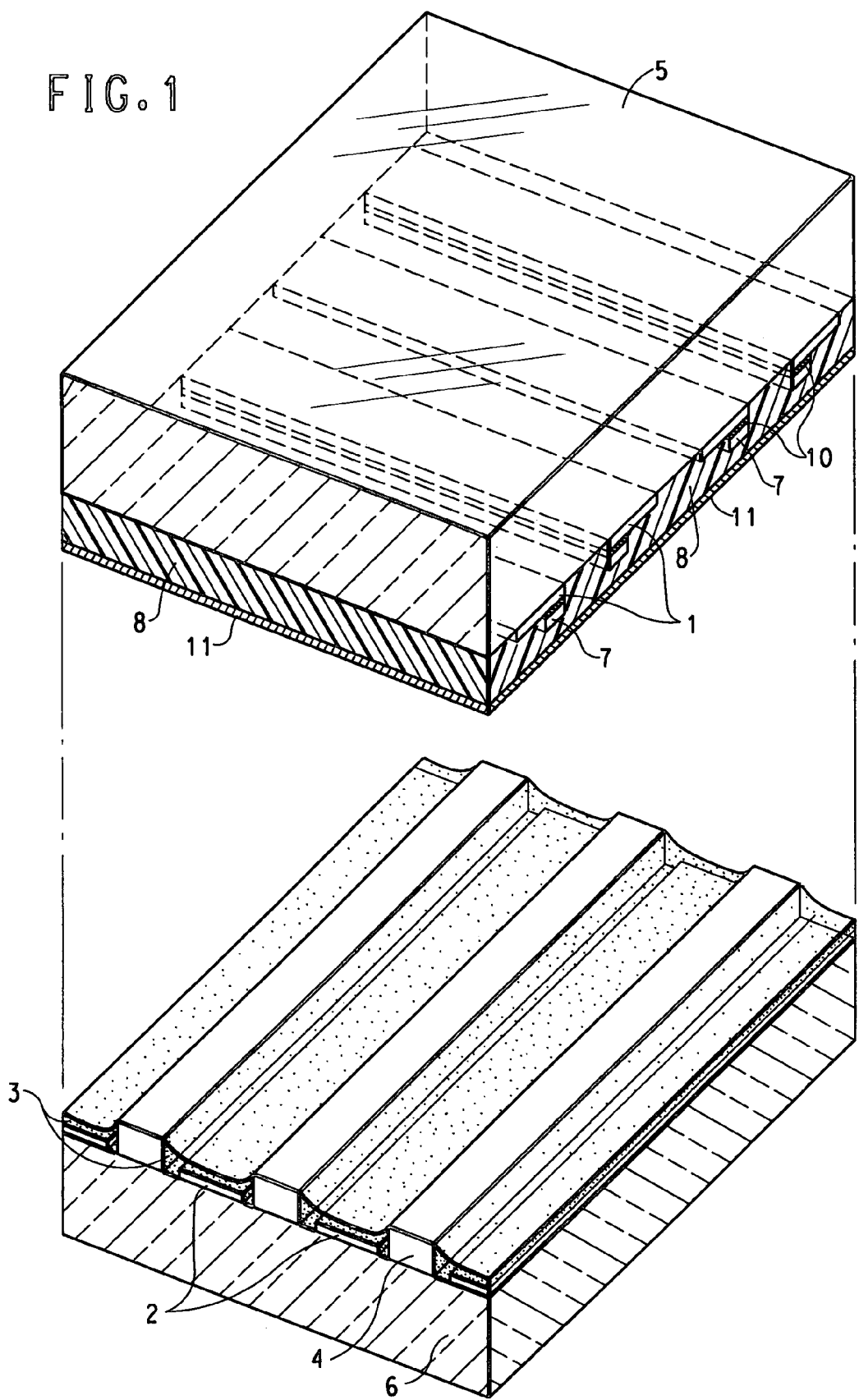
FIG. 1 is an expanded perspective diagram illustrating schematics of the AC PDP device prepared according to one embodiment of the present invention.

EXPLANATION OF SYMBOLS USED IN THE FIGURES 1 transparent electrode
2 address electrode
3 fluorescent material
4 cell barrier
5 front glass substrate
6 rear glass substrate
7 bus conductor electrode
7a exposed part
7b unexposed part
8 dielectric layer
9 protective MgO layer
10 black electrode (photosensitive thick film electrode layer)
10a exposed part
10b unexposed part
11 MgO layer
13 phototool (target)

SUMMARY OF THE INVENTION

The present invention is directed to methods of forming a lead-free black electrode comprising: supplying a substrate; supplying a lead-free black conductive composition comprising, based on weight percent total composition (a) 4-30 weight percent conductive metal oxides selected from $RuO_2$, one or more lead-free ruthenium-based polyoxides, and mixtures thereof, (b) 10-50 weight percent lead-free bismuth-based glass binder, and (c) 0-30 weight percent lead-free non-conductive black oxide; applying said black conductive composition onto said substrate; and sintering at a temperature in the range of 500-600° C. to form a black electrode; and wherein said black electrode comprises a crystallized glass component over the entire sintering range of 500-600° C. The present invention is further directed to electrodes formed by such methods.

DETAILED DESCRIPTION OF THE INVENTION

The present inventors discovered a method for the manufacture of a lead-free black electrode having excellent characteristics using a black conductive composition comprising conductive metal oxide particles of $RuO_2$, a lead-free ruthenium-based polyoxide or its mixture, a lead-free non-conductive black oxide, and a specific lead-free glass binder as the main components. That is, the present invention pertains to a method for forming a black electrode by performing sintering at a temperature in the range of 500-600° C. after applying a lead-free black conductive composition to a substrate. In this method, the aforementioned black electrode contains a binder comprising a crystallized glass component. The aforementioned black conductive composition contains conductive metal oxide particles of $RuO_2$, a lead-free black ruthenium-based polyoxide, or their mixture in an amount of 4-30 wt % based on the total weight of the composition, a lead-free non-conductive black oxide in an amount of 0-30 wt % based on the total weight of the composition, and a lead-free bismuth-based glass binder in an amount of 10-50 wt % based on the total weight of the composition.

The lead-free bismuth-based glass binder of the present invention comprises at least $Bi_2O_3$, ZnO, and $B_2O_3$ as the main components, with $Bi_2O_3$ being present in an amount of 70-90 weight percent, based on the total weight of the glass component.

The glass composition of the aforementioned lead-free bismuth-based glass binder used in the present invention is preferably in the following range.

BaO: 0-5 wt %
$B_2O_3$: 2-15 wt %
$SiO_2$: 0-3 wt %
$Al_2O_3$: 0-1 wt %
ZnO: 8-20 wt %
$Bi_2O_3$: 70-90 wt %.

The softening point of the aforementioned crystallized bismuth-based glass binder is preferably in the range of 400-500° C. Also, after firing anywhere in the range 500-600° C., crystal phases must be present in the binder phase.

In the present invention, the non conductive black oxide is preferably a Cr—Fe—Co oxide, Cr—Cu—Co oxide, Cr—Cu—Mn oxide, $Co_3O_4$, or their mixture. In the present invention, the conductive black oxide is a ruthenium-based polyoxide, preferably $Bi_2Ru_2O_7$, $Cu_xBi_{2-x}RuO_7$, $GdBiRu_2O_7$.

The present invention also includes the black electrode manufactured using the black conductive composition.

The method of the present invention can provide a black electrode with low contact resistance (ohmic resistance), good blackness (low L* value), and good balance other electrode characteristics.

The black electrode of the present invention comprises a crystallized glass component. The crystallized component is one whose crystalline structure can be identified by means of X-ray diffraction. In the present invention, a bismuth-based glass forms the crystallized glass component. The bismuth-based glass can be partially crystallized. There is no need to fully crystallize said bismuth-based glass.

The present invention involves the use of at least one substrate, and the black electrodes are formed on the substrate. If necessary, transparent electrodes made of ITO, etc., can also be formed between the substrate and the black electrodes. Conductive metal electrodes can also be formed on the black electrodes. The substrate is a transparent glass substrate, such as the front glass substrate of a PDP.

The composition used for the black electrodes is described below.

(A) Conductive Metal Oxide Particles

The black conductive compositions of the present invention comprise (a) conductive metal oxides (oxides with metallic conductivity) ($RuO_2$ and or ruthenium polyoxide as the conductive component). The ruthenium polyoxide is a type of pyrochlore, which is a multicomponent compound of $Ru^{+4}$, $Ir^{+4}$, or their mixture (M") represented by the general formula shown below:

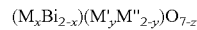

In the formula, M is selected from a group consisting of yttrium, thallium, indium, cadmium, lead, copper, and rare earth materials; M' is selected from a group consisting of platinum, titanium, chromium, rhodium, and antimony; M"

is ruthenium, iridium, or their mixture; x is 0-2, or x<1 with respect to monovalent copper; y is 0-0.5 but when M' is rhodium or is more than 1 of platinum, titanium, chromium, rhodium, or antimony, y is 0-1, and z is 0-1 but when M is bivalent lead or cadmium, y is at least equal to about x/2.

The above ruthenium-based pyrochlore oxide is described in detail in U.S. Pat. No. 3,583,931, which is herein incorporated by reference.

Lead containing ruthenium-based pyrochlore oxides may be used in the present invention when a lead-containing system is acceptable. Examples of such oxides include, lead ruthenate $Pb_2Ru_2O_6$, $Pb_{1.5}Bi_{0.5}Ru_2O_{6.5}$, $PbBiRu_2O_{6.75}$. However, these lead containing oxides are typically not desirable due to the effort to decrease lead content in electrode compositions.

Preferred ruthenium polyoxides are lead-free and include bismuth ruthenate $Bi_2Ru_2O_7$, $Cu_xBi_{2-x}RuO_7$, $GdBiRu_2O_7$, and mixtures thereof. These materials are readily available in purified form and have no adverse effect on the glass binder. These materials are also stable up to 1000° C. in air and relatively stable even under a reductive atmosphere.

Since the thick film composition of the present invention utilizes a Bi-based glass frit, BiRu pyrochlore, as the conductive oxide component, is particularly useful due to the chemical compatibility of the oxide and frit and decreased expense of the oxide component. For example, although $RuO_2$ functions as a black conductive oxide component, the Ru content in $RuO_2$ is about 70%, thus it is very expensive. BiRu pyrochlore has a Ru content of about 30%, which is one half of $RuO_2$, undergoes no significant chemical reaction with Ag below 600° C., and has good wetting with glass compared with black pigments other than $RuO_2$ and Ru, therefore it is a preferred lead-free black conductive oxide component.

The content of ruthenium oxide and/or ruthenium pyrochlore oxide based on the overall composition weight is 3-50 wt %, preferably 6-30 wt %, more preferably 8-25 wt %, and most preferably 9-20 wt %.

The surface area to weight ratio of the conductive metal oxide(s) of the present invention is in the range of 2 to 20 $m^2/g$. In one embodiment, the range is 5 to 15 $m^2/g$. In a further embodiment, the range of surface area to weight ratio is 6 to 10 $m^2/g$.

The black conductive compositions of the present invention can be used for the black electrode layer in the two layer structure of a bus electrode. Typically, a bus electrode comprises a highly conductive metal layer and a black electrode as its under layer (between the bus electrode and transparent substrate). The compositions of the present invention are suitable for such applications. The black electrode layer of the present invention comprises the conductive metal oxides, as described in (A) above as a necessary component. In addition to the conductive metal oxides of (A) above, the black electrode layer may also, optionally comprise the conductive metal particles described in (B) below. When the black electrode layer comprises the conductive metal particles of (B), a single layer structure can be used (i.e., the highly conductive metal layer and black electrode layer are combined in one layer).

(B) Conductive Metal Particles of the Black Conductive Compositions

As noted above, the black composition of the present invention may optionally, comprise precious metals including gold, silver, platinum, palladium, copper and combinations thereof. Virtually any shape metal powder, including spherical particles and flakes (rods, cones, and plates) may be used in the compositions of the present invention. The preferred metal powders are selected from the group comprising gold, silver, palladium, platinum, copper and combinations thereof. It is preferred that the particles be spherical. It has been found that the dispersion of the invention should not contain a significant amount of conductive metal solids having a particle size of less than 0.2 μm. When particles of this small size are present, it is difficult to adequately obtain complete burnout of the organic medium when the films or layers thereof are fired to remove the organic medium and to effect sintering of the inorganic binder and the metal solids. When the dispersions are used to make thick film pastes, which are usually applied by screen printing, the maximum particle size should not exceed the thickness of the screen. It is preferred that at least 80 percent by weight of the conductive solids fall within the 0.5-10 μm range.

In addition, it is preferred that the surface area to weight ratio of the optional electrically conductive metal particles not exceed 20 $m^2/g$, preferably not exceed 10 $m^2/g$ and more preferably not exceed 5 $m^2/g$. When metal particles having a surface area to weight ratio greater than 20 $m^2/g$ are used, the sintering characteristics of the accompanying inorganic binder are adversely affected. It is difficult to obtain adequate burnout and blisters may appear.

Often although not required, copper oxide is added to improve adhesion. The copper oxide should be present in the form of finely divided particles, preferably ranging in size from about 0.1 to 5 microns. When present as $Cu_2O$, the copper oxide comprises from about 0.1 to about 3 percent by weight of the total composition, and preferably from about 0.1 to 1.0 percent. Part or all of the $Cu_2O$ may be replaced by molar equivalents of CuO.

(C) Non-Conductive Oxide

It is also possible to add a non-conductive substance into the black conductive composition used in the present invention. Commercially available inorganic black pigments can be used as the preferred non-conductive oxides. Examples include non-conductive black oxides, such as Cr—Fe—Co oxide, Cr—Cu—Co oxide, Cr—Cu—Mn oxide, $Co_3O_4$, or their mixture. In the present invention, the shape of the non-conductive substance is not important. When the dispersion is used to prepare a thick film paste that is usually applied by means of screen printing, the maximum particle size should not exceed the thickness of the screen. It is preferred that at least 80 wt % of the non-conductive solid have a particle size in the range of 0.1-1.0 μm. The content of the non-conductive solid in the total composition is in the range of 0-30 wt %, preferably in the range of 0-15 wt %, based on the total weight of the composition.

(D) Glass Binder

The glass binder (also known as "frit") used in the present invention enhances sintering of the conductive and non conductive particles. The glass binder used in the present invention is a crystallized glass binder containing no lead.

The glass binder is a lead-free and cadmium-free Bi based amorphous glass. Other lead-free, low-melting glasses are P based or Zn—B based compositions. However, P based glass does not have good water resistance, and Zn—B glass is difficult to obtain in the amorphous state, hence Bi based glasses are preferred. Bi glass can be made to have a relatively low melting point without adding an alkali metal and has little problems in making a powder. In the present invention, Bi-based glass, especially lead-free crystallizable glass having the following specific composition, is the most preferred.

(I) Glass Composition
  BaO: 0-5 wt %
  $B_2O_3$: 2-15 wt %
  $SiO_2$: 0-3 wt %
  $Al_2O_3$: 0-1 wt %
  ZnO: 8-20 wt %
  $Bi_2O_3$: 70-90 wt %

(II) Softening Point
  400-500° C.
  In the specification of this patent application, the softening point is measured by means of differential thermal analysis (DTA).

(III) Crystallized Glass Component.
  Crystallized glass phases must be present in the binder after firing at temperatures in the range of 500-600° C.
  In the specification of this patent application, the crystallized glass phases can be easily observed by X-ray diffraction. When the Bi-based glass of the present invention is sintered at a temperature in the range of 500-600° C., crystals can be observed by means of X-ray diffraction.

In the present invention, the composition, softening point, and crystallization behavior of the glass binder are all important characteristics for ensuring that a good balance of properties of the black electrode is achieved.

When the softening point is below 400° C., melting of the glass may occur while organic materials are decomposed, allowing blisters to occur in the composition. Therefore it is preferred that the softening point of the glass is >400° C. On the other hand, the glass must soften sufficiently at the firing temperature employed, so the softening point should be <500° C., if the softening point exceeds 500° C. electrode peeling occurs at the corners and properties such as resistance, etc., are affected, compromising the balance of the electrode properties.

The glass binders used in the present invention preferably have a $D_{50}$ (i.e., the point at which ½ of the particles are smaller than and ½ are larger than the specified size) of 0.1-10 μm as measured by a Microtrac. More preferably, the glass binders have a $D_{50}$ of 0.5 to 1 μm. Usually, in an industrially desirable process, a glass binder is prepared by the mixing and melting of raw materials such as oxides, hydroxides, carbonates, etc., making into a cullet by quenching, mechanical pulverization (wet, dry), then drying in the case of wet pulverization. Thereafter, if needed, classification is carried out to the desired size. It is desirable for the glass binder used in the present invention to have an average particle diameter smaller than the thickness of the black conductive layer to be formed The content of the glass binder is preferably in the range of 10-50 wt %, more preferably, in the range of 25-45 wt %, based on the total weight of the composition. When the proportion of the glass binder is reduced, the adhesion to the substrate is weakened.

The composition of the present invention may contain organic compounds. The organic compounds used in the present invention include an organic polymeric binder, photopolymerization initiator, photocurable monomer, organic medium, etc. They will be explained below.

(E) Organic Polymeric Binder

The polymeric binder is important for use in the composition of the present invention. The water-based development possibility should be taken into consideration when selecting the polymeric binder. A polymeric binder with high resolution must be selected. The following binders satisfy these requirements. In other words, these binders are comonomers or inter-polymers (mixed polymers) prepared from (1) a non-acidic comonomer containing a $C_1$-$C_{10}$ alkyl acrylate, $C_1$-$C_{10}$ alkyl methacrylate, styrene, substituted styrene, or their combination and (2) an acidic comonomer in an amount of at least 15 wt % of the total weight of the polymer and having a component containing an ethylenically unsaturated carboxylic acid.

The presence of the acidic comonomer component in the composition is important to the technology of the present invention. Depending on its acidic functional groups, development becomes possible in an aqueous solution base, such as an aqueous solution containing 0.4 wt % of sodium carbonate. If the content of the acidic comonomer is less than 15%, the composition cannot be completely scoured by the aqueous base. If the content of the acidic comonomer is more than 30%, the stability of the composition becomes poor under the development conditions, and only partial development occurs in the image forming part. Examples of proper acidic comonomers include acrylic acid, methacrylic acid, crotonic acid, or other ethylenically unsaturated monocarboxylic acids, fumaric acid, itaconic acid, citraconic acid, vinyl succinic acid, maleic acid, or other ethylenically unsaturated dicarboxylic acids, their hemiesters, and, in some cases, their anhydrides and their mixtures. Methacryl polymers are more preferred than acryl polymers since they can combust more cleanly in a low-oxygen atmosphere.

When the aforementioned non-acidic comonomer is the aforementioned alkyl acrylate or acryl methacrylate, the content of such a non-acidic comonomer is at least 50 wt %, preferably 70-75 wt %, of the polymeric binder. If the non-acidic comonomer is styrene or substituted styrene, it is preferred that the content of such an non-acidic comonomer be 50 wt % of [that of] the polymeric binder, while the other 50 wt % is an acidic anhydride, such as the hemiester of maleic anhydride. The preferred substituted styrene is α-methylstyrene.

Although it is not preferred, the non-acidic part of the polymeric binder may contain about 50 wt % or less of another non-acidic comonomer to substitute the alkyl acrylalte, alkyl methacrylate, styrene, or substituted styrene of the polymer. Examples include acrylonitrile, vinyl acetate, and acrylamide. However, since complete combustion becomes more difficult in this case, it is preferred to use such a monomer at less than about 25 wt % of the total amount of the polymeric binder. The binder can be a single copolymer or a mixture of copolymers as long as the aforementioned various conditions can be satisfied. It is also possible to add a small amount of other polymeric binders in addition to the aforementioned copolymer. Examples include polyethylene, polypropylene, polybutylene, polyisobutylene, ethylene-propylene copolymer, and other polyolefins as well as polyethylene oxide and other lower alkylene oxide polymers.

These polymers can be manufactured by means of the solution polymerization technology that is commonly used in the field of acrylic ester polymerization.

Typically, the aforementioned acidic acrylic ester polymer can be manufactured as follows. An α- or β-ethylenically unsaturated acid (acidic comonomer) is mixed with one or several types of copolymerizable vinyl monomers (non-acidic comonomer) in an organic solvent with a relatively low boiling point (75-150° C.) to obtain a 10-60% monomer mixture solution. A polymerization catalyst is then added into the obtained monomer mixture to perform polymerization. Next the obtained mixture is heated to the reflux temperature of the solvent under normal pressure. After the polymerization reaction is virtually finished, the generated acidic polymer solution is cooled to room temperature. A sample is recovered, and the viscosity, molecular weight, and acid equivalent of the polymer are measured.

The aforementioned acid-containing polymeric binder is preferably has molecular weight of less than 50,000.

When the aforementioned composition is coated by means of screen printing, it is preferred that the Tg (glass transition temperature) of the polymeric binder exceed 60° C.

The content of the organic polymeric binder is usually in the range of 5-45 wt % of the total amount of the dried photopolymerizable layer.

(F) Photopolymerization initiator

A desirable photopolymerization initiator is thermally inactive but can generate free chemical groups when exposed to chemical rays at a temperature of 185° C. or lower. Such a photopolymerization initiator includes a substituted or non-substituted polynuclear quinone, which is a compound having two intramolecular rings in a conjugated carbon ring. Examples include 9,10-anthraquinone, 2-methyl anthraquinone, 2-ethyl anthraquinone, 2-t-butyl anthraquinone, octamethyl anthraquinone, 1,4-naphthoquinone, 9,10-phenanthrenequinone, benzo[a]anthracene-7,12-dione, 2,3-naphthacene-5,12-dione, 2-methyl-1,4-naphthoquinone, 1,4-dimethyl anthraquinone, 2,3-dimethyl anthraquinone, 2-phenyl anthraquinone, 2,3-diphenyl anthraquinone, retene quinone, 7,8,9,10-tetrahydronaphthacene-5,12-dione, and 1,2,3,4-tetrahydrobenzo[a]anthracene-7,12-dione. Other useful photopolymerization initiators are disclosed in U.S. Pat. No. 2,760,863 (however, several of them are thermally active even at a low temperature of 85° C.; they are vicinal ketaldonyl alcohols, such as benzoin or pivaloin; methyl and ethyl ethers of benzoin or other acyloin ethers; α-methyl benzoin, α-allyl benzoin, α-phenyl benzoin, thioxanthone and its derivatives, and hydrocarbon-substituted aromatic acyloins containing hydrogen donors).

Photoreductive dyes and reducing agents can be used as the initiator. Examples include those disclosed in U.S. Pat. No.2,850,445, No. 2,875,047, No. 3,097,96 [sic], No. 3,074,974, No. 3,097,097, and No. 3,145,104, phenazine, oxazine, and quinones, such as Michler's ketone, ethyl Michler's ketone, benzophenone, etc., 2,4,5-triphenyl imidazoyl dimer formed with a hydrogen donor containing a leuco dye, and their mixtures (disclosed in U.S. Pat. No. 3,427,161, No. 3,479,185, and No. 3,549,367). Also, the sensitizer disclosed in U.S. Pat. No. 4,162,162 can be used together with photopolymerization initiator and photopolymerization inhibitor. The content of the photopolymerization initiator or photopolymerization initiator system is in the range of 0.05-10 wt % based on the total amount of the dried photopolymerizable layer.

(G) Photocurable monomer

The photocurable monomer component used in the present invention contains at least one type of addition polymerizable ethylenically unsaturated compound having at least one polymerizable ethylene group.

Such a compound can cause the formation of the polymer, depending on the presence of free groups, and a chain-extending addition polymerization can take place. The monomer compound has a non-gas form, that is, it has a boiling point higher than 100° C. and can provide plasticity to the organic polymeric binder.

Preferable monomers that can be used either alone or in combination with other monomers include t-butyl (meth)acrylate, 1,5-pentanediol di(meth)acrylate, (N,N-dimethyl aminoethyl(meth)acrylate, ethylene glycol di(meth)acrylate, 1,4-butanediol di(meth)acrylate, diethylene glycol di(meth)acrylate, hexamethylene glycol di(meth)acrylate, 1,3-propanediol di(meth)acrylate, decamethylene glycol di(meth)acrylate, 1,4-cyclohexaned iol di(meth)acrylate, 2,2-dimethylolpropane di(meth)acrylate, glycerol di(meth)acrylate, tripropylene glycerol di(meth)acrylate, glycerol tri(meth)acrylate, trimethylolpropane tri(meth)acrylate, compounds disclosed in U.S. Pat. No. 3380381, 2,2-di(p-hydroxyphenyl)-propane di(meth)acrylate, pentaerythritol tetra(meth)acrylate, triethylene glycol diacrylate, polyoxyethyl-1,2-di-(p-hydroxyethyl)propane dimethacrylate, bisphenol A di-[3-(meth)acryloxy-2-hydroxypropyl)ether, bisphenol A di-[2-(meth)acryloxyethyle)ether, 1,4-butanediol di-(3-methacryloxy-2-hydroxypropyl)ether, triethylene glycol dimethacrylate, polyoxypropyl trimethyrol propane triacrylate, butylene glycol di(meth)acrylate, 1,2,4-butanediol tri(meth)acrylate, 2,2,4-trimethyl-1,3-pentanediol di(meth)acrylate, 1-phenylethylene-1,2-dimethacrylate, diallyl fumarate, styrene, 1,4-benzenediol dimethacrylate, 1,4-diisopropenyl benzene, and 1,3,5-triisopropenyl benzene (in this case, "(meth)acrylate" includes both "acrylate and methacrylate)".

Ethyleneiacally unsaturated compounds with a molecular weight of at least 300 can also be used. Examples include $C_2$-$C_{15}$ alkylene glycol or polyalkylene glycols having 1-10 ether bonds, or the compounds disclosed in U.S. Pat. No. 2,927,022, such as the alkylene or polyalkylene glycol acrylate manufactured from compounds having addition polymerizable ethylene bonds, especially when they are present as terminal groups.

Other useful monomers are disclosed in U.S. Pat. No. 5,032,490. Preferable monomers include polyoxyethylated trimethylolpropane tri(meth)acrylate, ethylated pentaerythritol acrylate, trimethylolpropanetri(meth)acrylate, dipentaerythritol monohydroxy pentacrylate, and 1,10-decanediol dimethacrylate.

Other preferable monomers include monohydroxypolycaprolactone monoacrylate, polyethylene glycol diacrylate (molecular weight: about 200), and polyethylene glycol dimethacrylate (molecular weight: about 400). The content of the unsaturated monomer component is in the range of 1-20 wt % based on the total weight of the dried photopolymerizable layer.

(H) Organic Medium

The main purpose of using an organic medium is so that the dispersion of the finely pulverized solid content of the aforementioned composition can be easily coated on ceramics or other substrates. Consequently, first of all, the organic medium must be able to disperse the solid content while maintaining the proper stability. Secondly, the rheology characteristics of the organic medium must provide the dispersion with a good coating characteristic.

For the organic medium, the solvent component, which may also be a solvent mixture, should be properly selected so that the polymer and other organic components can be completely dissolved in it. The selected solvent should be inactive (no reaction) with other components in the paste composition. The selected solvent should have very high volatility so that it can evaporate from the dispersion even if coated at a relatively low temperature under atmospheric pressure. The solvent should have such a volatility that the paste can dry quickly on a screen at ordinary room temperature during the printing operation. The preferable solvent used for the paste composition has a normal-pressure boiling point lower than 300° C., preferably, lower than 250° C. Examples of such a solvent include aliphatic alcohols, acetic esters, propionic esters, or the esters of the aforementioned alcohols; pine resin, α- or β-terpineol, or their mixture, or other terpinenes; ethylene glycol, ethylene glycol monobutyl ether, butyl Cellosolve acetate, or other esters of ethylene glycols; butyl Carbitol, butyl Carbitol acetate, Carbitol acetate, or other carbitol esters; Texanol (2,2,4-trimethyl-1,3-pentanediol monoisobutyrate), and other appropriate solvents.

In addition to the aforementioned components, the following substances can also be added into the composition of the present invention.

(I) Additional Components

Dispersants, stabilizers, plasticizers, mold releasing agents, dispersants [sic], stripping agents, defoaming agents, lubricants, and other additional components that are well known in this field can also be added into the composition. General examples of the proper substances are disclosed in U.S. Pat. No. 5,32,490.

Applications and Uses

If the aforementioned photosensitive material is added into the black electroconductive composition, a photosensitive composition can be prepared. The black electroconductive photosensitive composition can be formed as a film using spinning, dipping, or other film coating technology, or using screen printing, chemical etching, or other conventional patterning technology.

When the black electroconductive composition of the present invention is used as an electroconductive material, that composition can be formed on a dielectric layer or a glass substrate (for example, a bare glass panel).

The black conductive compositions of the present invention may also be utilized in processes for patterning thick film electrically functional patterns using a photosensitive polymer layer. For example, as described in Patent Publication WO 02/03766 A2 to Keusseyan herein incorporated by reference. Keusseyan describes a process for forming a pattern having electrically functional properties on a substrate comprising the steps of: (a) providing a photosensitive layer having a tacky surface disposed on a substrate; (b) providing a transfer sheet comprising a removable support and at least one layer of a thick film composition disposed on the support; (c) image-wise exposing the photosensitive tacky surface to form an imaged layer having unexposed tacky and exposed non-tacky areas; (d) applying the thick film composition of the transfer sheet onto the imaged layer; (e) separating the transfer sheet from the substrate wherein the thick film substantially remains on the support in the exposed non-tacky areas to form a patterned thick film composition; and (f) subjecting the patterned thick film composition to heat thereby forming a patterned article.

When the black conductive compositions of the present invention are used as conductive materials, these compositions may be formed on various substrates, including a dielectric layer or glass substrate (e.g., bare glass panel).

The composition of the present invention may be patterned on a transparent substrate, topped with a photosensitive material, and exposed to UV, etc., from the transparent substrate (back side) to form a photomask.

Flat Panel Display Applications

The present invention includes black electrodes formed from the above black conductive compositions. The black electrodes of the present invention can be favorably used in flat panel display applications, particularly in alternating-current plasma display panel devices. The black electrodes can be formed between the device substrate and conductor electrode array.

In one embodiment, the electrode of the present invention is used in AC PDP applications, as described below. It is understood that the compositions and electrodes of the present invention may be used in other flat panel display applications and their description in AC PDP devices is not intended to be limiting. An example of the black electrodes of the present invention used in an alternating-current plasma display panel is explained below. This description includes two-layer electrodes comprising a black electrode between the substrate and conductor electrode (bus electrode). Also, the method for making an alternating-current plasma display panel device is outlined.

The alternating-current plasma display panel device consists of front and back dielectric substrates with a gap and an electrode array containing parallel first and second electrode composite groups in a discharge space filled with ionizing gas. The first and second electrode composite groups face each other perpendicularly with the discharge space in the middle. A certain electrode pattern is formed on the surface of the dielectric substrate, and a dielectric material is coated on the electrode array on at least one side of the dielectric substrate. In this device, at least the electrode composite on the front dielectric substrate is fitted with the conductor electrode array group connected to the bus conductor on the same substrate, and with the black electrode of the present invention formed between the above substrate and the above conductor electrode array.

FIG. 1 illustrates the black electrode of the present invention in an AC PDP. FIG. 1 shows the AC PDP using the black electrode of the present invention. As shown in FIG. 1, the AC PDP device has the following components: underlying transparent electrode (1) formed on glass substrate (5); black electrode (10) formed on the transparent electrode (1) (the black conductive composition of the present invention is used for the black electrode (10)); bus electrode (7) formed on the black electrode (10) (bus electrode (7) is a photosensitive conductor composition containing conductive metal particles from metals selected from Au, Ag, Pd, Pt and Cu or combinations thereof (this is explained in more detail below)). The black electrode (10) and bus conductor electrode (7) are exposed imagewise by actinic radiation to form a pattern, developed in a basic aqueous solution, and fired at an elevated temperature to remove the organic components and to sinter the inorganic material. The black electrode (10) and bus conductor electrode (7) are patterned using an identical or very similar image. The final result is a fired, highly conductive electrode composite, which appears to be black on the surface of the transparent electrode (1), and when placed on the front glass substrate, reflection of external light is suppressed.

The word 'black' used in this specification means a black color with significant visual contrast against a white background. Therefore, the term is not necessarily limited to black which possesses the absence of color. The degree of "blackness" may be measured with a calorimeter to determine an L-value. The L-value represents lightness where 100 is pure white and 0 is pure black. Although shown in FIG. 1, the transparent electrode described below is not necessary in forming the plasma display device of the present invention.

When a transparent electrode is used, $SnO_2$ or ITO is used for forming the transparent electrode (1), by chemical vapor deposition or electro-deposition such as ion sputtering or ion plating. The components of the transparent electrode and method for its formation in the present invention are those of the conventional AC PDP production technology, well known to those in the art.

As shown in FIG. 1, the AC PDP device of the present invention is based on a glass substrate having dielectric coating layer (8) and MgO coating layer (11) over the patterned and fired metallization.

The conductor lines are uniform in line width and are not pitted or broken, have high conductivity, optical clarity and good transparency between lines.

Next, a method for making both a bus electrode and black electrode over the optional transparent electrode on the glass substrate of the front plate of a PDP device is illustrated.

As shown in FIG. 2, the formation method of the one embodiment of the present invention involves a series of processes ((A)-(E)).

(A) A process of applying a black electrode-forming photosensitive thick film composition layer (10) on a transparent electrode (1) formed using $SnO_2$ or ITO according to a conventional method known to those in the art, on the glass substrate (5), then drying the thick film composition layer (10) in a nitrogen or air atmosphere. The black electrode composition is a lead-free black conductive composition of the present invention. (FIG. 2(A)).

(B) Applying to the first applied black electrode composition layer (10) a photosensitive thick film conductor composition (7) for forming the bus electrodes, then drying the thick film composition layer (7) in a nitrogen or air atmosphere. The photosensitive thick film conductive composition is described below. (FIG. 2(B)).

(C) Imagewise exposing the first applied black electrode composition layer (10) and the second bus electrode composition layer (7) to actinic radiation (typically a UV source) through a phototool or target (13) having a shape corresponding to a pattern of the black and bus electrodes arranged in correlation with the transparent electrodes (1), using exposure conditions that yield the correct electrode pattern after development. (FIG. 2(C))

(D) A process of developing the exposed parts (10a, 7a) of the first black conductive composition layer (10) and the second bus electrode composition layer (7) in a basic aqueous solution, such as a 0.4 wt % sodium carbonate aqueous solution or other alkali aqueous solution. This process removes the unexposed parts (10b, 7b) of the layers (10, 7). The exposed parts (10a, 7a) remain (FIG. 2(D)). The developed product is then dried.

Figure 2A:
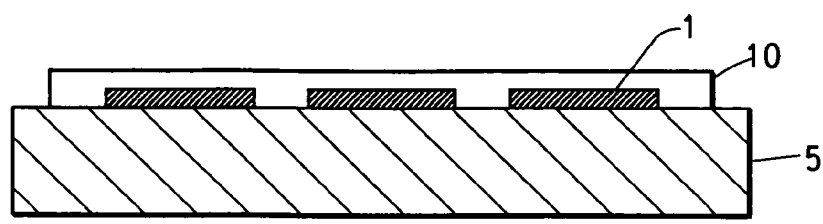
FIG. 2 is an explanatory diagram of a series of processes of the method for making the bus electrode and interconnecting electrodes positioned between said bus electrode and a transparent electrode on the same glass substrate: (A) a step for applying the photosensitive thick film composition layer for black electrode formation; (B) a step for applying a photosensitive thick film conductive composition for bus electrode formation; (C) a step for setting an exposed electrode pattern; (D) development step; (E) firing step.
Figure 2B:
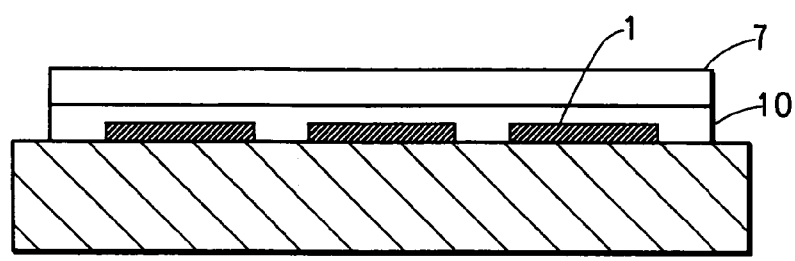
Figure 2C:
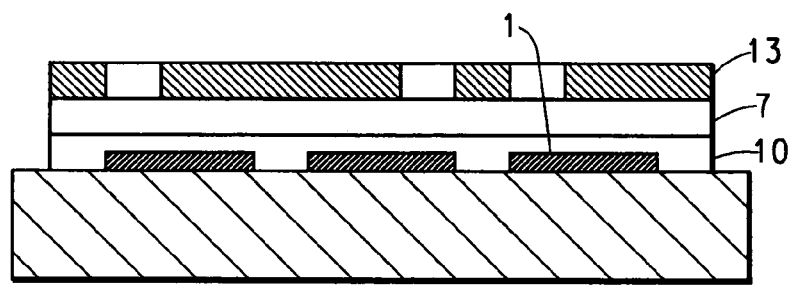
Figure 2D:
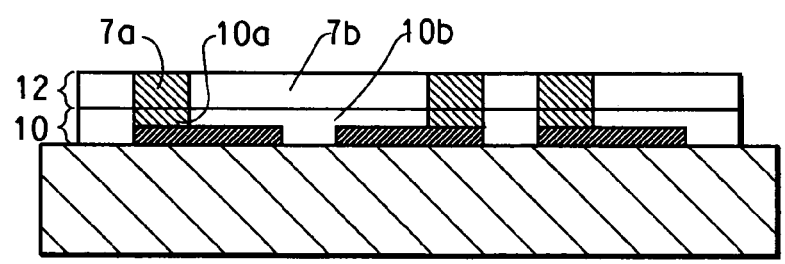
Figure 2E:
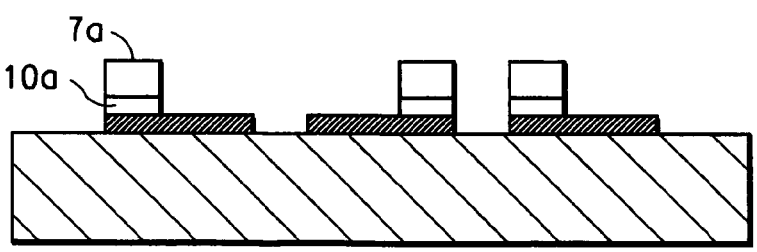
Figure 3A:
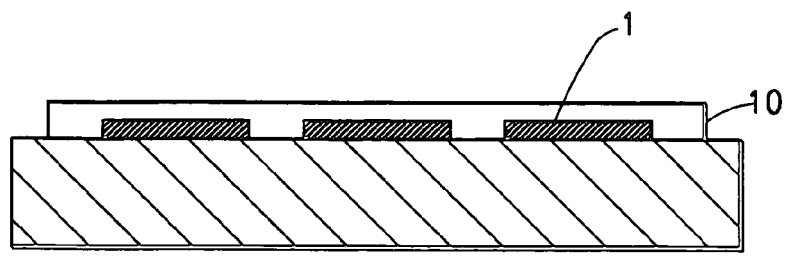
FIG. 3 is an explanatory diagram of a series of processes of the method for making the bus electrode and interconnecting electrodes positioned between said bus electrode and transparent electrode on the same glass substrate: (A) a step for applying the photosensitive thick film composition layer for black electrode formation; (B) a step for setting an exposed electrode pattern; (C) development step (D) firing step (E) a step for applying a photosensitive thick film conductive composition for bus electrode formation; (F) a step for setting an electrode pattern by imagewise exposure of the second bus electrode composition layer; (G) development step; (H) firing step.
Figure 3B:
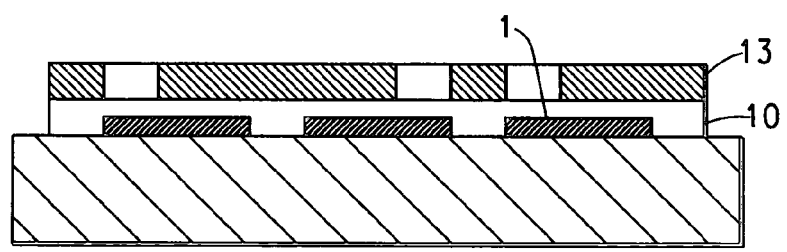
Figure 3C:
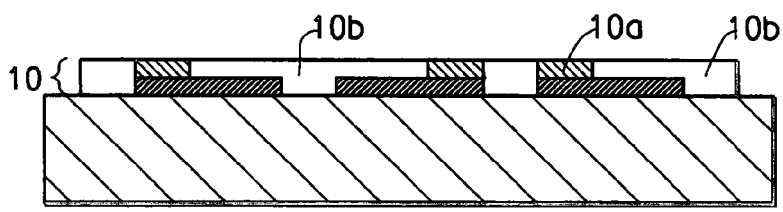
Figure 3D:
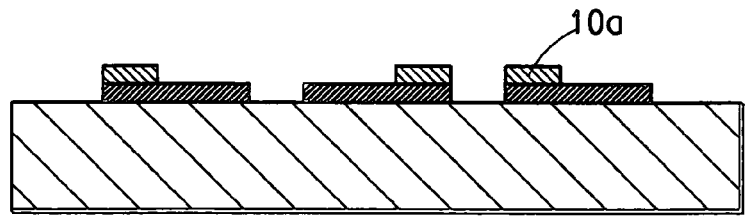
Figure 3E:
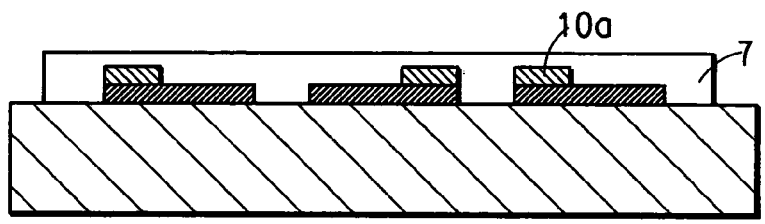
Figure 3F:
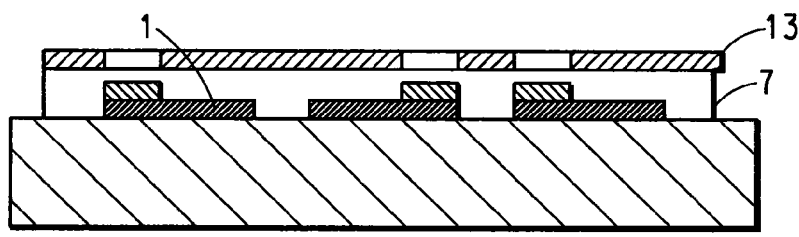
Figure 3G:
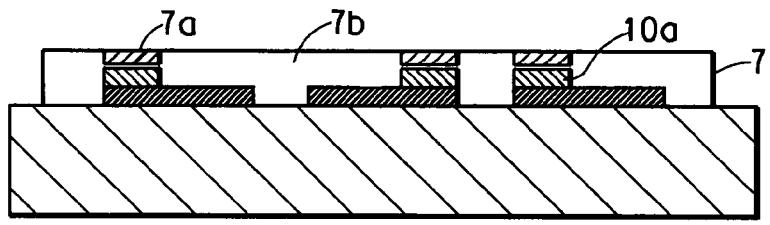
Figure 3H:
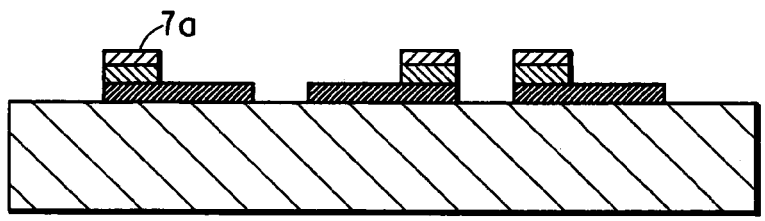

(E) After process, (D), the parts are then fired at a temperature of 450-650° C., depending upon the substrate material, to sinter the inorganic binder and conductive components (FIG. 2(E)).

Black stripes can be used in the present invention. The black stripes can be formed at the same time as the bus electrodes, or formed separately from the bus electrodes. When the black stripes are formed at the same time as the bus electrodes, said black stripes are formed at the same time as the black electrodes.

The formation method of the second embodiment of the present invention is explained below with FIG. 3. For convenience, the numbers assigned for each part of FIG. 3 are same as FIG. 2. The method of the second embodiment involves a series of processes (A'-H').

A'. A process of applying a black electrode-forming photosensitive thick film composition layer (10) on a transparent electrode (1) formed using $SnO_2$ or ITO according to a conventional method known to those in the art, on the glass substrate (5), then drying the thick film composition layer (10) in a nitrogen or air atmosphere. The black electrode composition is a lead-free black conductive composition of the present invention. (FIG. 3(A)).

B'. Imagewise exposing the first applied black electrode composition layer (10) to actinic radiation (typically a UV source) through a phototool or target (13) having a shape corresponding to a pattern of the black electrodes arranged in correlation with the transparent electrodes (1), using exposure conditions that yield the correct black electrode pattern after development. (FIG. 3(B)).

C'. A process of developing the exposed part (10a) of the first black conductive composition layer (10) in a basic aqueous solution such as a 0.4 wt % sodium carbonate aqueous solution or other alkali aqueous solution for removal of the unexposed parts (10b) of the layers (10) (FIG. 3(C)). The developed product is then dried.

D'. After process, (C'), the parts are then fired at a temperature of 450-650° C., depending upon the substrate material, to sinter the inorganic binder and conductive components (FIG. 3(D)).

E'. A process of applying the bus electrode-forming photosensitive thick film composition layer (7) to the black electrode (10a) according to the fired and patterned part (10a) of the first photosensitive thick film composition layer (10), then drying in a nitrogen or air atmosphere (FIG. 3(E)). The photosensitive thick film conductor composition is described below.

F'. Imagewise exposing the second applied bus electrode composition layer (7) to actinic radiation (typically a UV source) through a phototool or target (13) having a shape corresponding to a pattern of the bus electrodes arranged in correlation with the transparent electrodes (1) and black electrode (10a), using exposure conditions that yield the correct electrode pattern after development. (FIG. 3(F)).

G'. A process of developing the exposed part (7a) of the second bus conductive composition layer (7) in a basic aqueous solution such as a 0.4 wt % sodium carbonate aqueous solution or other alkali aqueous solution for removal of the unexposed parts (7b) of the layers (7) (FIG. 3(G)). The developed product is then dried.

H'. After process, (G'), the parts are then fired at a temperature of 450-650° C., depending upon the substrate material, to sinter the inorganic binder and conductive components (FIG. 3(H)).

The third embodiment (not shown) involves a series of processes ((i)-(v)) shown below.

(i) The process of loading a black electrode composition on a substrate. This black electrode composition is the black conductive composition of the present invention described above.

(ii) The process of loading a photosensitive conductive composition on a substrate. This photosensitive conductive composition is described below.

(iii) The process of setting an electrode pattern by imagewise exposure of the black composition and conductive composition by actinic radiation.

(iv) The process of developing the exposed black composition and conductive composition by a basic aqueous solution for removal of the area not exposed to actinic radiation.

(v) The process of firing the developed conductive composition.

Next, an example of using the black electrode of the present invention in an AC plasma display panel will be explained. The following explanation is based on an example of a two-layer electrode, with black electrodes formed between the substrate and conductive metal electrodes (bus electrodes). Referring back to FIG. 1, after forming the transparent electrode (1) in relation to the black electrode (10) and bus electrode (7) on the front glass substrate (5), the front glass substrate assembly is covered with dielectric layer (8), then coated with MgO layer (11). Next, the front glass substrate (5) is combined with rear glass substrate (6). Cell barriers 4 are formed on rear glass substrate 6, with fluorescent substance 3 being screen coated on the inside to exhibit display cells. The electrode formed on the front substrate assembly is perpendicular to the address electrode formed on the rear glass substrate. The discharge space formed between the front glass substrate (5) and rear glass substrate (6) is sealed with a glass seal and at the same time a discharge gas mixture is sealed into the space. The AC PDP device is thus assembled.

Next, bus conductive compositions for bus electrodes are explained below.

The bus conductive compositions used in the present invention may be photosensitive thick film conductive compositions available commercially. As noted above, the bus conductive composition comprises (a) conductive metal particles of at least one metal selected from Au, Ag, Pd, Pt, and Cu and combinations thereof; (b) at least one inorganic binder; (c) photoinitiator; and (d) photocurable monomer. In one embodiment of the present invention, the bus conductive composition comprises Ag.

The conductive phase is the main component of the above composition, typically comprising silver particles with a particle diameter within the range of 0.05-20 μm (microns) in a random or thin flake shape. The bus conductive composition is herein described with reference to one embodiment comprising silver particles, but is not intended to be limiting. When a UV-polymerizable medium is used together with the composition, the silver particles should have a particle diameter within the range of 0.3-10μ. Preferred compositions should contain 65-75 wt % of silver particles based on the overall thick film paste.

The silver conductive composition for forming a bus electrode may also contain 0-10 wt % of a glass binder and/or 0-10 wt % of refractory materials that do not form glass or a precursor as needed, in addition to Ag. Examples of the glass binder include lead-free glass binders described in the Claims of the present invention. Refractory materials that do not form glass and precursors are, e.g., alumina, copper oxide, gadolinium oxide, tantalum oxide, niobium oxide, titanium oxide, zirconium oxide, cobalt iron chromium oxide, aluminum, copper, various commercially available inorganic pigments, etc.

Objectives for adding the second, third, and more inorganic additives in addition to such main components are for control of the pattern shape, suppression or promotion of sintering during firing, adhesive property retention, control of the main-metal component diffusion, inhibition of discoloration near the bus electrode, control of resistance, control of the thermal expansion coefficient, mechanical strength retention, etc. The type and amount are selected as needed within the range of having no significant adverse effects on the basic performance.

Furthermore, the silver conductive compositions may also contain 10-30 wt % of a photosensitive medium in which the above particulate materials are dispersed. Such a photosensitive medium may be polymethyl methacrylate and a polyfunctional monomer solution. This monomer is selected from those with a low volatility for minimizing evaporation during the silver conductive composition paste preparation and printing/drying process before the UV curing. The photosensitive medium also contains a solvent and UV initiator. The preferred UV polymerizable medium includes a polymer based on methyl methacrylate/ethyl acrylate in a 95/5 ratio (weight based). The silver conductive composition described above has a viscosity of 10-200 Pa-s, for a free-flowing paste.

Suitable solvents for such a medium are, but not limited to, butyl Carbitol acetate, Texanol® and β-terpineol. Additional solvents that may be useful include those listed in Section (G) Organic Medium, above. Such a medium may be treated with dispersants, stabilizers, etc.

Preparation of Photosensitive Wet-Developable Pastes (A) Preparation of Organic Materials The solvent and acrylic polymer were mixed, stirred, and heated to 100° C. to complete dissolution of the binder polymer. The resulting solution was cooled to 80° C., treated with the remaining organic components, stirred to complete the dissolution of all solids, passed through a 325-mesh filter screen, and cooled.

(B) Preparation of Paste

The paste was prepared by mixing an organic carrier, one or more monomers, and other organic components in a mixing vessel under yellow light. The inorganic materials were then added to the mixture of organic components. The entire composition was then mixed until the inorganic particles were wetted with the organic material. This mixture was roll-milled using a 3-roll mill. The resulting paste was used as obtained or was passed through a 635-mesh filter screen. At this point, the paste viscosity was adjusted by carriers or solvents to a viscosity most suitable for optimum processing.

Care was taken to avoid dirt contamination in the process of preparing paste compositions and in preparing parts, since such contamination can lead to defects (I) Preparation of 2-Layer Test Parts (1) Formation of Black Electrodes A glass substrate (glass substrate for PP8 display produced by NEG) with a transparent electrode thin film ITO formed one side, was cut to a size of 2×3 inch. The paste was screen printed on its surface using a screen mask with a pattern of about 5.5-cm square. The black conductive paste of the present invention was applied onto the glass substrate, with the aforementioned transparent electrode thin film ITO formed on it, by screen printing, using a 380-mesh polyester screen. The product was dried at 100° C. in a warm-air circulating oven for 15 min. The dry film thickness was in the range of 4-6 μm.

(2) Formation of Conductive Metal Electrodes (Bus Electrodes)

Next, the photo-imageable Ag conductor paste was applied by screen printing using a 380-mesh polyester screen. The photo-imageable Ag conductor paste was a photosensitive Ag paste containing 2 wt % of bismuth-based glass frit B and 65-75 wt % of Ag powder (average particle size: 1.3-2.0 μm).

The product was dried again at 100° C. in a warm-air circulating oven for 15 min. The dry film thickness was in the range of 6-8 μm. Consequently, the dry film thickness of the two-layer structure was in the range of 10-14 μm.

(3) UV Pattern Exposure

The part with the two-layer structure was then exposed, through a phototool, to a collimated UV light source (small UV exposure machine: I rays (365 nm)) (illuminance: 5-20 mW/cm$^2$; exposure energy: 200 mJ/cm$^2$).

(4) Development

The exposed part was placed on a conveyor then led into a spray developer containing a 0.4 wt % sodium carbonate aqueous solution as the developer solution. The developer solution temperature was maintained at 30° C., and sprayed at 10-20 psi. The part was subjected to a development time of 1.5 times TTC (Time to Clean). The developed part was dried by blowing off the excess water in a forced air stream (5) Firing The dried product was fired in an air atmosphere using a belt furnace (produced by Koyo Thermosystem Co., Ltd.) using a trapezoidal firing profile having a total length of 1.5 h with a peak temperature of 580° C. (7 min) or in a 20-min box profile554 at a prescribed temperature.

(II) Preparation Single Layer Test Parts.

(1) Printing and Drying Single Layer.

A glass substrate (glass substrate for PP8 display produced by NEG) was cut into a size of 2×3 inch. The paste was screen printed on its surface using a screen mask with a pattern of about 5.5-cm square. Screen printing was carried out using a 380-mesh polyester screen. The part was dried at 100° C. in a warm-air circulating oven for 15 min. The dry film thickness was in the range of 4-6 μm.

(2) Firing

The dried product was fired in an air atmosphere using a belt furnace (produced by Koyo Thermosystem Co., Ltd.) using a trapezoidal firing profile having a total length of 1.5 h with a peak temperature of 580° C. (7 min) or in a 20-min box profile554 at a prescribed temperature.

EXAMPLES

The amount of the constituent components will be expressed in weight percent (wt %) for the following application examples and controls unless specified otherwise.

Test Procedures

The following items were evaluated for the application examples and controls.

Dried Black Thickness

The dry film thickness of the black electrode was measured at four different points using a contact profilometer.

Dried Ag/Black Thickness

The Ag electrode was coated on the dried film of the black electrode, then dried. The dry film thickness of the Ag/Black composite layer was measured using the same method as black electrode above.

L value Ag/Black Two Layer

After firing, the blackness viewed from the back of the glass substrate is measured mechanically. For blackness, the color (L*) was measured using the optical sensor SZ and color measurement system Σ80 of Nippon Denshoku Kogyo with calibration using a standard white plate, with 0 being pure black and 100 pure white.

Contact Resistance

Figure 4A:
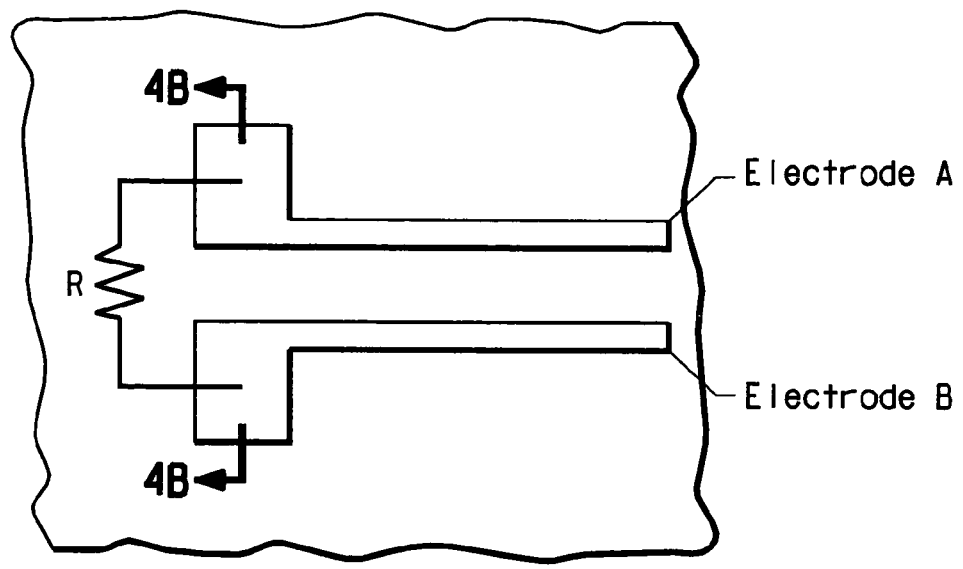
FIG. 4: This diagram shows an electrode pattern for measuring the ohmic resistance.
Figure 4B:
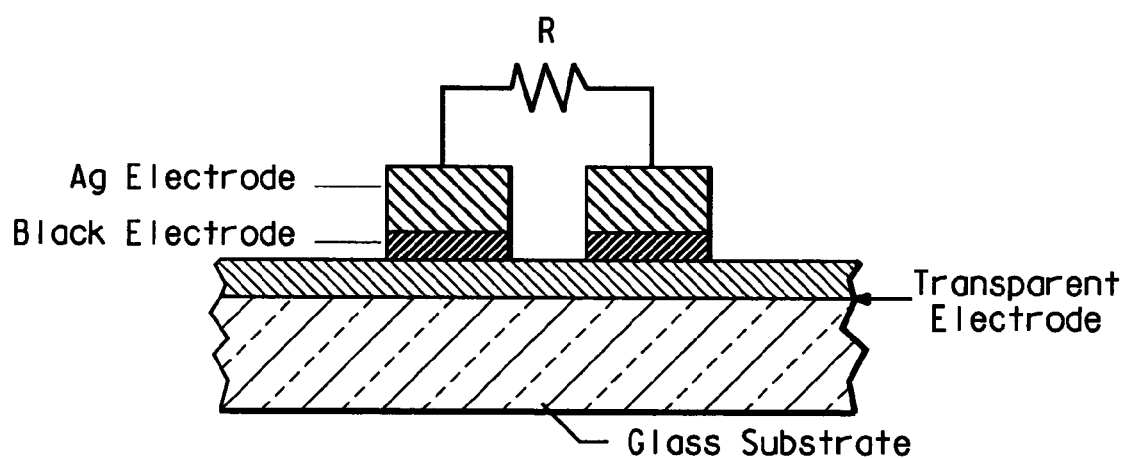

The contact resistance was measured as follows. The electrode structure consisted of a first layer made of a transparent electrode film (ITO), a second layer made of the black conductive composition (black electrode), and a conductive metal electrode (containing Ag as the main component) as the third layer, as shown in FIG. 4. This electrode can be manufactured by following the steps (1)-(5) of said (I). The resistance between electrodes A and B in the pattern shown in FIG. 4 was measured. The resistance was measured using the 4-terminal method and R6871 E produced by the ADVANTEST Corporation.

Since the specific resistance of the black electrode in the second layer is higher than that of the transparent electrode in the first layer and the conductive metal electrode in the third layer, the resistance of the black electrode in the second layer is essentially measured using this method. This resistance measurement is an indication of how good the electrical connection is between the transparent electrode layer and the conductive metal electrode layer (via the black electrode layer). The resistance so measured is called the "contact resistance".

X-Ray Diffraction Analysis

XRD Single Layer Test Part. (Black Only)

A glass substrate (glass substrate for PP8 display produced by NEG) was cut a size of 2×3 inch. The black conductive paste was screen printed on its surface using a screen mask with a pattern of about 5.5-cm square. Screen printing was carried out using a 380-mesh polyester screen. The part was dried at 100° C. in a warm-air circulating oven for 15 min. The dry film thickness was in the range of 4-6 μm. The dried part was first belt fired at 400° C. to remove organic material, then fired in a box furnace at 450° C., 500° C., 550° C. or 600° C.

XRD 2 Layer Test Part. (Black+Ag)

A glass substrate (glass substrate for PP8 display produced by NEG) was cut a size of 2×3 inch. The Ag conductive paste was screen printed on its surface using a screen mask with a pattern of about 5.5-cm square. Screen printing was carried out using a 380-mesh polyester screen. The part was dried at 100° C. in a warm-air circulating oven for 15 min.

The black conductive paste was then screen printed over the dry Ag layer using a screen mask with a pattern of about 5.5-cm square. Screen printing was carried out using a 380-mesh polyester screen. The part was dried at 100° C. in a warm-air circulating oven for 15 min.

The dried 2-layer part was first belt fired at 400° C. to remove organic material, then fired in a box furnace at 450° C., 500° C., 550° C. or 600° C.

After firing, the test parts were subjected to X-ray diffraction analysis (Using Rigaku Corporation—RINT1500) to identify the presence of crystal phases in the fired electrode layer.

After eliminating those X-ray diffraction peaks assignable to the conductive and non-conductive materials, the level of crystallization in the binder phase was assessed as being either, none, (i.e, no glass binder crystallization observed) low (i.e. a low level of glass binder crystallization), medium (i.e. a moderate level of glass binder crystallization) and high (i.e. a high level of glass binder crystallization. Note, even at a high level of binder crystallization, amorphous glass phase still remains.

Next, the application examples and comparative examples will be explained. The manufacturing conditions of the electrodes are as described in (I) (1)-(5) and (II), (1)-(2).

The components listed in the following Tables 1-6 were used in the following application examples. Also, BiRu pyrochlore powder (Ru mixture A; specific surface area: 11 $m^2/g$) was used as the ruthenium polyoxide, and a Cr—Fe—Co oxide was used as the black powder A.

TABLE 1

Organic Binder Composition in Weight Percent Total Organic Binder Composition

| | | Organic Binder | |
|---|---|---|---|
| | | wt % Organic Binder A | wt % Organic Binder B |
| Solvent A | Texanol [Transliteration] | 46.50 | 55.10 |
| Acrylic Resin A | Acrylic resin (Carboset XPD1234) | 34.80 | 36.20 |
| Initiator A | Photopolymerization initiator (Irgacure 651: __) | | 2.60 |
| Initiator B | Photopolymerization initiator (DETX: diethyloxysantone) | 8.80 | 2.30 |
| Initiator C | Photopolymerization initiator (EDAB: Ethyl 4-dimethylaminobenzoate) | 8.30 | 2.20 |
| Inhibitor A | Stabilizer (TAOBN) | 0.06 | 0.07 |
| Resin B | PVP/VA copolymer of vinyl pyrrolidone and vinyl acetate | 1.50 | 1.50 |
| Total | | 100.0 | 100.0 |

TABLE 2

Vehicle for Black paste

| Vehicle for Black paste | | wt % |
|---|---|---|
| Organic Binder A | | 18.00 |
| Organic Binder B | | 18.00 |
| Monomer A | TMPEOTA (trimethylolpropane ethoxy triacrylate) | 7.90 |
| Solvent A | Solvent Texanol | 5.50 |
| Organic Additive A | Additive Malonic acid | 1.00 |
| Organic Additive B | Additive BHT | 0.20 |
| Total | | 50.60 |

TABLE 3

Vehicle for Ag Paste

| Vehicle for Ag paste | | wt % |
|---|---|---|
| Organic Binder B | | 19.00 |
| Monomer A | TMPEOTA (trimethylolpropane ethoxy triacrylate) | 4.10 |
| Organic Additive A | Additive Malonic acid | 0.20 |
| Organic Additive B | Additive BHT | 0.20 |
| Solvent A | Solvent Texanol | 3.00 |
| Total | | 26.50 |

TABLE 4

Ag paste recipe w %

| | paste name | | | | |
|---|---|---|---|---|---|
| | Ag-1 | Ag-2 | Ag-3 | Ag-4 | Ag-5 |
| Ag powder A | 71.0 | 69.0 | 69.0 | 69.0 | 69.0 |
| Bi Frit B | 2.5 | | 3.0 | | 3.0 |
| Bi Frit A | | 3.0 | | 3.0 | |
| Black powder A | | | | 1.0 | 1.0 |
| Vehicle for Ag Paste | 26.5 | 28.0 | 28.0 | 27.0 | 27.0 |
| Total | 100.0 | 100.0 | 100.0 | 100.0 | 100.0 |

TABLE 5

Black paste recipe w %

| Paste name | Black-1 | Black-2 | Black-3 | Black-4 | Black-5 | Black-6 | Black-7 | Black-8 | Black-9 | Black-10 | Black-11 | Black-12 |
|---|---|---|---|---|---|---|---|---|---|---|---|---|
| Vehicle for Black | 50.6 | 51.0 | 51.0 | 52.9 | 55.6 | 52.6 | 57.1 | 55.3 | 55.6 | 50.2 | 50.2 | 50.2 |
| Pb Frit A | | | | | 29.7 | | | | | | | |
| Pb Frit B | | | | | | | 27.8 | 30.1 | | | | |
| Pb Frit C | | | | | | | | | | | | |
| Pb Frit D | | | | | | | | | 29.7 | | | |
| Bi Frit A | 35.8 | | | | | | | | | | | |
| Bi Frit B | | | | 33.1 | | | | | | | | |
| Bi Frit C | | | 35.5 | | | | | | | 36.0 | 27.0 | 18.0 |
| Bi Frit D | | 35.5 | | | | | | | | | 9.0 | 18.0 |
| Bi Frit E | | | | | | 33.6 | | | | | | |
| Ru Mixture A | 6.9 | 6.9 | 6.9 | 7.1 | 7.5 | 7.1 | 7.7 | 7.4 | 7.5 | 7.8 | 7.8 | 7.8 |
| Black powder A | 6.6 | 6.6 | 6.6 | 6.8 | 7.2 | 6.8 | 7.4 | 7.1 | 7.2 | 6.0 | 6.0 | 6.0 |
| Total | 100.0 | 100.0 | 100.0 | 100.0 | 100.0 | 100.0 | 100.0 | 100.0 | 100.0 | 100.0 | 100.0 | 100.0 |

TABLE 5-continued

Black paste recipe w %

| Paste name | Black-13 | Black-14 | Black-15 | Black-16 | Black-17 | Black-18 | Black-19 | Black-20 | Black-21 | Black-22 | Black-23 |
|---|---|---|---|---|---|---|---|---|---|---|---|
| Vehicle for Black | 50.2 | 50.2 | 51.3 | 51.2 | 51.0 | 50.8 | 50.5 | 50.8 | 50.7 | 50.6 | 50.3 |
| Pb Frit A | | | | | | | | | | | |
| Pb Frit B | | | | | | | | | | | |
| Pb Frit C | | | | | | | | | | | |
| Pb Frit D | | | | | | | | | | | |
| Bi Frit A | | | | | | | | | | | |
| Bi Frit B | | | 16.4 | 16.1 | 15.8 | 15.3 | 14.8 | 8.1 | 8.0 | 7.8 | |
| Bi Frit C | 9.0 | | | | | | | | | | 26.7 |
| Bi Frit D | 27.0 | 36.0 | 18.2 | 17.9 | 17.6 | 17.0 | 16.4 | 27.0 | 26.6 | 26.2 | 8.2 |
| Bi Frit E | | | | | | | | | | | |
| Ru Mixture A | 7.8 | 7.8 | 7.4 | 8.1 | 8.8 | 10.2 | 11.6 | 7.3 | 8.0 | 8.7 | 9.8 |
| Black powder A | 6.0 | 6.0 | 6.8 | 6.8 | 6.8 | 6.7 | 6.7 | 6.7 | 6.7 | 6.7 | 5.1 |
| Total | 100.0 | 100.0 | 100.0 | 100.0 | 100.0 | 100.0 | 100.0 | 100.0 | 100.0 | 100.0 | 100.0 |

TABLE 6

Glass Compositions in Weight Percent Total Glass Composition

| Glass Name | Bi Frit A | Bi Frit D | Bi Frit C | Bi Frit B | Bi Frit E | Pb Frit B | Pb Frit C | Pb Frit A | Pb Frit D |
|---|---|---|---|---|---|---|---|---|---|
| PbO | | | | | | 67.5 | 62.06 | 70 | 69 |
| $Bi_2O_3$ | 69.82 | 71.8 | 76 | 56.8 | 58.8 | | | | |
| SiO2 | 7.11 | 1.0 | 0.5 | 18.2 | 16.2 | 27.5 | 30.81 | 15 | 18 |
| $Al_2O_3$ | 2.13 | 0.5 | 0.5 | 2.3 | 2.3 | | 2.57 | | |
| $B_2O_3$ | 8.38 | 9.6 | 7.5 | 9.1 | 9.1 | 3 | 1.84 | 15 | 13 |
| CaO | 0.53 | | | | | | | | |
| ZnO | 12.03 | 14.4 | 15 | 12.7 | 12.7 | | 2.72 | | |
| BaO | | 2.9 | 0.5 | 0.9 | 0.9 | | | | |
| MgO | | | | | | 2 | | | |
| Total | 100 | 100 | 100 | 100 | 100 | 100 | 100 | 100 | 100 |
| Average particle size (um) [μm] | 0.9 | 0.6 | 0.7 | 0.9 | 0.9 | 0.8 | 0.9 | 1 | 1 |
| Softening point (DTA) | 500 | 449 | 425 | 568 | 556 | 553 | 597 | 464 | 491 |
| DTA crystallization peak reference value | | | 597 | | | | | | |

Application Example 1 and Comparative Examples 1-4

Ru mixture A, and Black powder A were mixed with different glass powders to manufacture the paste compositions listed in Table 7. The aforementioned operations (I) and (II) were carried out to manufacture test samples for each application example and control.

TABLE 7

Black Composition in Weight Percent Total Composition

| | Control 1 | Control 2 | Example 1 | Control 3 | Control 4 |
|---|---|---|---|---|---|
| Ag Paste Paste name | Black 1 (wt %) | Black 2 (wt %) | Ag-1 Black 3 (wt %) | Black 4 (wt %) | Black 5 (wt %) |
| Vehicle for Black paste | 50.6 | 51.03 | 51.0 | 52.9 | 55.6 |
| Pb Frit A | | | | | 29.7 |
| Bi Frit A | 35.8 | | | | |
| Ru Mixture A | 6.9 | 6.9 | 6.9 | 7.1 | 7.5 |
| Bi Frit B | | | | 33.1 | |
| Bi Frit C | | | 35.5 | | |
| Bi Frit D | | 35.5 | | | |
| Black powder A | 6.6 | 6.6 | 6.6 | 6.8 | 7.2 |
| Total | 100.0 | 100.0 | 100.0 | 100.0 | 100.0 |

Results

The results are shown in Table 8.

TABLE 8

|  | Control 1 | Control 2 | Example 1 | Control 3 | Control 4 |
|---|---|---|---|---|---|
| Conductive | BiRu | BiRu | BiRu | BiRu | BiRu |
| Dried Black thickness/um [μm] | 5.1 | 4.9 | 4.9 | 4.9 | 4.9 |
| Dried Ag/black thickness/um | 11.7 | 11.0 | 10.5 | 11.9 | 11.0 |
| Calculated dried Ag thickness/um | 6.6 | 6.1 | 5.6 | 7.0 | 6.1 |
| TTC in sec | 6.6 | 6.9 | 6.7 | 6.5 | 7.3 |
| L color for Ag/Black on ITO | 10.6 | 6.9 | 6.5 | 10.6 | 9.5 |
| Ohmic resistance (ohm) one time fired | 13.8 | 7.7 | 8.1 | 10.2 | 5.6 |
| Ohmic resistance (ohm) two times fired | 64.7 | 85.4 | 18.7 | 27.1 | 17.0 |
| Ohmic resistance (ohm) three times fired | 336.6 | 259.7 | 30.4 | 101.6 | 87.9 |
| XRD - Level of crystal. |  |  |  |  |  |
| XRD 2-layer fired @ 400° C. | None | None | None | None | None |
| XRD 2-layer fired @ 450° C. | None | Medium | Medium | None | None |
| XRD 2-layer fired @ 500° C. | None | Medium | Medium | None | None |
| XRD 2-layer fired @ 550° C. | Medium | Medium | Medium | Medium | None |
| XRD 2-layer fired @ 600° C. | High | None | Medium | High | None |
| XRD black only fired @ 400° C. | None | None | None | None | None |
| XRD black only fired @ 450° C. | None | None | Medium | None | None |
| XRD black only fired @ 500° C. | None | Medium | Medium | None | None |
| XRD black only fired @ 550° C. | Medium | Low | Medium | None | None |
| XRD black only fired @ 600° C. | High | None | Med-Low | Low | None |

As can be seen from the aforementioned application examples and controls, the lead-free black conductive composition of the present invention can retain the desired characteristics, with a good balance black electrode properties. In particular, in Application Example 1, the contact resistance (ohmic resistance in table 8) after repeated firing is the lowest, and the L value the lowest.

Results of X-ray diffraction

Only Example 1 shows acceptable electrode performance, in particular low ohmic resistance.

Example 1 has crystals present in the binder phase after firing at 500° C., 550° C. and 600° C., i.e. crystals are present over the entire range from 500° C. to 600° C.

Example 1 clearly falls within the scope of the present invention.

All the controls have unacceptable ohmic resistance. While some controls have crystals present in the binder phase after firing at some specific temperatures, they do not have crystals in the binder phase at all temperatures between 500° C. and 600° C., and as such do not fall within the scope of this invention.

Application Examples 2-4 and Controls 5-12

In order to evaluate the reproducibility of the contact resistance performance of black paste 3 (based on Bi frit C). Black paste 3 was tested in a 2-layer structure with 3 more Ag pastes, (Ag-2, Ag-3 and Ag-4. Examples 2, 3, and 4 respectively). In examples 2-4 the length of the profile was increased to 2.5 hrs (verses 1.5 hrs for example 1).

Black pastes 1,2,4 and 5 (used in controls 1-4 above) and black paste 6 (based on Bi frit E) was also included for comparison. (Controls 5-12)

Results

The results are shown in Table 9.

TABLE 9

| Set No. | | | Control 5 | Control 6 | Example 2 | Control 7 | Control 8 |
|---|---|---|---|---|---|---|---|
| Ag paste: Ag-2 | | | | | | | |
| Ag Description: Ag 69 wt % | | | | | | | |
| Bi Frit A: 3 wt % | | | | | | | |
| Black paste | | | Black-1 | Black-2 | Black-3 | Black-6 | Black-4 |
| Black Description | | | Bi Frit A | Bi Frit D | Bi Frit C | Bi Frit E | Bi Frit B |
| Ohmic R | fire × 1 | | 25 | 14 | 19 | 35 | 28 |
| @ 580 C. × 2.5 h | | | | | | | |
| | fire × 2 | | 100 | 37 | 26 | 264 | 170 |
| | fire × 3 | | 684 | 74 | 24 | 184 | 274 |

| Set No. | | | Control 9 | Example 3 | Control 10 | Control 11 | Control 12 | Example 4 |
|---|---|---|---|---|---|---|---|---|
| Ag paste | | | | Ag-3 | | | | Ag-4 |
| Ag Description | | | | Ag: 69 wt % | | | | Ag: 69 wt % |
| | | | | Bi Frit B: 3 wt % | | | | Bi Frit A: 3 wt % |
| | | | | | | | | Black powder A: 1 wt % |
| Black paste | | | Black-1 | Black-3 | Black-6 | Black-4 | Black-1 | Black-3 |
| Black Description | | | Bi Frit A | Bi Frit C | Bi Frit E | Bi Frit B | Bi Frit A | Bi Frit C |
| Ohmic R @ 580 C. × 2.5 h | fire × 1 | | 47 | 17 | 46 | 31 | 23 | 18 |
| | fire × 2 | | 151 | 30 | 370 | 355 | 126 | 23 |
| | fire × 3 | | 585 | 49 | 180 | 491 | 517 | 22 |

Irrespective of the Ag conductor used for the 2 layer testing, the ohmic resistance performance of black paste 3 (based on Bi frit C) is good, even with a longer firing profile.

The black pastes based on the other Bi frits consistently show poor ohmic resistance performance.

Application Examples 5-11 and Controls 13-15

The purpose of examples 5-11 and controls 13-15 was to investigate if Bi-frit C (which performs well in examples 1-4 above) can be blended with Bi-frit D (which did not perform well in controls above) to give black paste compositions with acceptable ohmic resistance performance.

Examples 5-11, and controls 13-15 were fired using a 1.5 hr long profile.

Results

The results are shown in Table 10.

The results in table 10 show that black pastes consisting of a blend of Bi frit D and Bi frit C can give acceptable ohmic resistance performance, particularly when the level of Bi frit C is high.

The purpose of controls 17-24 was to investigate if Bi-frit B could be blended with Bi-frit D to give black paste compositions with acceptable ohmic resistance performance (i.e. can 2 frits which do not give good performance in a black paste when used on their own, perform well when blended?)

Controls 17-24 were fired using a 1.5hr long profile.

Results

The results are shown in Table 11.

TABLE 10

| Set No. | | Example 5 | Example 6 | Example 7 | Example 8 | Control 13 | Example 9 | Example 10 | Example 11 | Control 14 | Control 15 |
|---|---|---|---|---|---|---|---|---|---|---|---|
| Ag | | Ag-3 | | | | | Ag-5 | | | | |
| Ag Description | | Ag: 69 wt % | | | | | Ag: 69 wt % | | | | |
| | | Bi Frit B: 3 wt % | | | | | Bi Frit B: 3 wt % | | | | |
| | | | | | | | Black powder A: 1 wt % | | | | |
| Black | | Black-10 | Black-11 | Black-12 | Black-13 | Black-14 | Black-10 | Black-11 | Black-12 | Black-13 | Black-14 |
| Black Description | | Bi Frit C 100 | Bi Frit C 75 | Bi Frit C 50 | Bi Frit C 25 | Bi Frit C 0 | Bi Frit C 100 | Bi Frit C 75 | Bi Frit C 50 | Bi Frit C 25 | B Frit C 0 |
| | | Bi Frit D 0 | Bi Frit D 25 | Bi Frit D 50 | Bi Frit D 75 | Bi Frit D 100 | Bi Frit D 0 | Bi Frit D 25 | Bi Frit D 50 | Bi Frit D 75 | Bi Frit D 100 |
| resistivity/mohm/sq@5 um | | 6.7 | 6.9 | 6.7 | 7.4 | 7.1 | 7.0 | 7.0 | 7.3 | 7.1 | 7.5 |
| Ohmic R | fire × 1 | 7 | 7 | 7 | 7 | 7 | 7 | 7 | 7 | 6 | 6 |
| | fire × 2 | 11 | 15 | 20 | 32 | 43 | 13 | 12 | 24 | 55 | 76 |
| | fire × 3 | 14 | 20 | 28 | 32 | 51 | 16 | 16 | 30 | 143 | 173 |
| dried Black thickness/um | | 4.3 | 4.3 | 4.0 | 4.0 | 4.1 | 4.3 | 4.3 | 4.0 | 4.0 | 4.1 |
| dried Ag/Black thickness/um | | 9.8 | 10.0 | 9.8 | 9.6 | 10.0 | 10.0 | 10.0 | 9.7 | 9.6 | 9.5 |
| fired thickness/um | | 3.8 | 4.0 | 3.5 | 4.0 | 3.9 | 3.7 | 3.6 | 3.6 | 3.9 | 3.5 |
| edge curl/um | | 2.1 | 1.6 | 1.5 | 1.7 | 1.9 | 2.0 | 1.9 | 2.0 | 1.5 | 1.8 |
| L-color for Ag/Black on ITO | | 7.9 | 7.7 | 8.2 | 8.0 | 7.8 | 6.5 | 6.4 | 6.9 | 7.0 | 6.4 |

TABLE 11

| Set No. | | Control 17 | Control 18 | Control 19 | Control 20 | Control 21 | Control 22 | Control 23 | Control 24 |
|---|---|---|---|---|---|---|---|---|---|
| Ag | | Ag-4 | | | | | | | |
| Ag Description | | Ag: 69 wt % Bi Frit A: 3 wt % Black powder A: 1 wt % | | | | | | | |
| Black | | Black-15 | Black-16 | Black-17 | Black-18 | Black-19 | Black-20 | Black-21 | Black-22 |
| Black Description | | Bi Frit B | Bi Frit B | Bi Frit B | Bi Frit B | Bi Frit B | Bi Frit B | Bi Frit B | Bi Frit B |
| | | Bi Frit D | Bi Frit D | Bi Frit D | Bi Frit D | Bi Frit D | Bi Frit D | Bi Frit D | Bi Frit D |
| | | mixture 1 | mixture 1 | mixture 2 | mixture 3 | mixture 4 | mixture 5 | mixture 6 | mixture 7 |
| resistivity/mohm/sq @ 5 um | | 7.6 | 7.2 | 7.2 | 7.6 | 7.5 | 6.6 | 7.6 | 7.4 |
| Ohmic R | fire × 1 | 11 | 9 | 8 | 7 | 7 | 9 | 8 | 7 |
| | fire × 2 | 234 | NA | 156 | 116 | 99 | 160 | 168 | 154 |
| | fire × 3 | 762 | NA | 490 | 591 | 477 | 388 | 366 | 403 |
| dried Black thickness/um | | 4.0 | 4.0 | 4.0 | 3.9 | 4.0 | 4.0 | 4.0 | 4.0 |
| dried Ag/Black thickness/um | | 10.0 | 9.9 | 9.8 | 9.8 | 9.9 | 9.8 | 9.8 | 9.8 |
| fired thickness/um | | 4.1 | 4.0 | 4.4 | 4.4 | 4.6 | 4.2 | 4.1 | 4.1 |
| edge curl/um | | 1.7 | 2.4 | 1.9 | 2.9 | 2.9 | 2.7 | 2.5 | 2.6 |
| L-color for Ag/Black on ITO | | 10.8 | 10.2 | 10.1 | 10.0 | 9.4 | 10.1 | 10.0 | 9.6 |

The blending of Bi-frit B and Bi-frit D consistently gives poor performance

In Application Examples 12-14, the effect of varying the film thickness of the black electrode was evaluated. For these examples, the dried film thickness was varied from 3-5 μm. The results obtained are shown in table 12.

TABLE 12

| Set No. | | Example 12 | Example 13 | Example 14 |
|---|---|---|---|---|
| Ag | | | Ag-1 | |
| Black | | | Black-23 | |
| Black Description | | | Bi Frit C + B mixture | |
| Dried Black thickness | | Thin-film | Standard | Thick-film |
| dried Black thickness/um | | 3.0 | 4.0 | 5.0 |
| dried Ag/Black thickness/um | | 8.1 | 9.0 | 10.5 |
| resistivity/mohm/sq @ 5 um | | 9.0 | 9.1 | 8.7 |
| ohmic R | fire × 1 | 4.3 | 5.2 | 3.5 |
| | fire × 2 | 11.2 | 10.5 | 10.5 |
| | fire × 3 | 18.0 | 15.8 | 15.5 |
| fired thickness/um | | 3.7 | 3.8 | 4.1 |
| 1 edge curl/um | | 1.0 | 1.5 | 1.2 |
| L-color for Ag/Black on ITO | | 12.5 | 5.1 | 4.0 |

The contact resistance performance is maintained regardless of the thickness of the black layer.

What is claimed is:

1. A method of forming a lead-free black electrode comprising:

supplying a substrate;

supplying a lead-free black conductive composition comprising, based on the weight percent of the total composition (a) 4-30 weight percent conductive metal oxides selected from $RuO_2$, one or more lead-free ruthenium-based polyoxides, and mixtures thereof, wherein the surface area to weight ratio of the conductive metal oxide is less than or equal to 15 $m^2/g$; (b) 10-50 weight percent lead-free bismuth-based glass binder, wherein said glass binder comprises, based on weight percent total glass binder: 0-5% BaO, 2-15% $B_2O_3$, 0-3% $SiO_2$, 0-1% $Al_2O_3$, 8-20% ZnO, and 70-90% $Bi_2O_3$, and (c) 0-30 weight percent lead-free non-conductive black oxide; applying said black conductive composition onto said substrate: and sintering at a temperature in the range of 500-600° C. to form a black electrode; and wherein said black electrode comprises a crystallized glass component over the entire sintering range of 500-600° C.

2. The method of claim 1 wherein the softening point of said glass binder is in the range of 400-500° C.

3. The method of claim 1 wherein said non-conductive black oxide is selected from a Cr—Fe—Co type oxide, Cr—Cu—Co type oxide, Cr—Cu—Mn type oxide, $Co_3O_4$, and mixtures thereof.

4. The method of claim 1 wherein said ruthenium-based polyoxide is selected from $Bi_2Ru_2O_7$, $Cu_2Bi_2RuO_7$, $GdBiRu_2O_7$, and mixtures thereof.

5. The method of claim 1 further comprising a transparent electrode formed between the substrate and said black conductive composition.

* * * * *